United States Patent
Atkin et al.

(10) Patent No.: US 6,289,303 B1
(45) Date of Patent: Sep. 11, 2001

(54) METHOD AND SYSTEM FOR SUPPORTING MULTIPLE PEN BASED LANGUAGE SETS

(75) Inventors: Steven Atkin, Palm Bay, FL (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,650

(22) Filed: Jan. 29, 1999

(51) Int. Cl.[7] .............................. G06F 17/20; G06F 17/21
(52) U.S. Cl. ................................... 704/8; 707/535
(58) Field of Search ..................... 704/1, 2, 3, 8; 707/530, 535, 536, 541; 382/185, 187; 345/333, 141, 150, 145; 341/128, 171

(56) References Cited

U.S. PATENT DOCUMENTS

| | | | |
|---|---|---|---|
| 4,545,023 | 10/1985 | Mizzi | 708/143 |
| 5,454,046 | * 9/1995 | Carman, II | 382/186 |
| 5,455,901 | * 10/1995 | Friend et al. | 395/149 |
| 5,463,696 | * 10/1995 | Beenink et al. | 382/186 |
| 5,526,481 | 6/1996 | Parks et al. | 382/187 |
| 5,644,653 | 7/1997 | Sunakawa et al. | 382/187 |
| 5,724,457 | * 3/1998 | Fukushima | 382/311 |
| 5,734,882 | * 3/1998 | Lopresti et al. | 395/600 |
| 5,742,705 | * 4/1998 | Parthasarathy | 382/185 |
| 5,809,498 | * 9/1998 | Lopresti et al. | 707/6 |
| 5,889,888 | * 3/1999 | Marianetti, II et al. | 382/187 |
| 6,002,390 | * 12/1999 | Masui | 345/173 |
| 6,014,616 | * 1/2000 | Kim | 704/8 |
| 6,154,758 | * 11/2000 | Chiang | 707/541 |

* cited by examiner

*Primary Examiner*—Patrick N. Edouard
(74) *Attorney, Agent, or Firm*—Richard A. Henkler; Leslie A. VanLeeuwen; Bracewell & Patterson, L.L.P.

(57) ABSTRACT

A method and system for supporting multiple language sets in a data processing system, where each character of the language set is a pen based input character. A language set is designated among multiple language sets with which a pen-based character is associated within a data processing system in response to a user input. A pen based input character is penned into said data processing system. The pen based input character is identified within only said designated language set. The pen based input character is translated into a graphically displayed iconic representation of the pen based input character represented in a designated language set.

12 Claims, 5 Drawing Sheets

| UNICODE VALUE | PENNED CHARACTER IMAGE | CHARACTER NAME |
|---|---|---|
| U+0020 | ⌴ | Space |
| U+0021 | ! | Exclamation Mark |
| U+0022 | ʺ | Quotation Mark |
| U+0023 | # | Number Sign |
| U+0024 | $ | Dollar Sign |
| U+0025 | % | Percent Sign |
| U+0026 | & | Ampersand |
| U+0027 | ʾ | Apostrophe |
| U+0028 | ( | Left Parenthesis |
| U+0029 | ) | Right Parenthesis |
| U+002A | ✱ | Asterisk |
| U+002B | + | Plus Sign |
| U+002C | , | Comma |

|   | 002 | 003 | 004 | 005 |
|---|---|---|---|---|
| 0 | SP<br>0020 | 0<br>0030 | @<br>0040 | P<br>0050 |
| 1 | !<br>0021 | 1<br>0031 | A<br>0041 | Q<br>0051 |
| 2 | "<br>0022 | 2<br>0032 | B<br>0042 | R<br>0052 |
| 3 | #<br>0023 | 3<br>0033 | C<br>0043 | S<br>0053 |
| 4 | $<br>0024 | 4<br>0034 | D<br>0044 | T<br>0054 |

92 points to row 1.

*Fig. 4*

|   | 300 | 301 | 302 | 303 |
|---|---|---|---|---|
| 0 | SP<br>3000 | [<br>3010 | ⊙⊙<br>3020 | ～<br>3030 |
| 1 | ˋ<br>3001 | ]<br>3011 | \|<br>3021 | ⟨<br>3031 |
| 2 | ○<br>3002 | ⊤<br>3012 | \|\|<br>3022 | ⟨"<br>3032 |
| 3 | //<br>3003 | =<br>3013 | \|\|\|<br>3023 | /<br>3033 |
| 4 | (″)<br>3004 | (<br>3014 | ×<br>3024 | /"<br>3034 |

94 points to row 0.

METHOD AND SYSTEM FOR SUPPORTING MULTIPLE PEN BASED LANGUAGE SETS

BACKGROUND OF THE INVENTION

1. Field of the Invention

The present invention relates in general to multilingual data processing systems and, more particularly, to pen based data processing systems. Still more particularly, the present invention relates to a method and system for supporting multiple language sets in a data processing system where each character of the language set is a pen based character.

2. Description of the Related Art

Pen based input devices are quickly becoming a mobile tool as integral in the business and personal world as the laptop computer. These devices may also be known as personal digital assistants (PDAs) and handheld computers. Typically, pen based input devices can store contact information, a calendar, email, bank statements and other information in a compact, hand-held device, which can be carried in a shirt pocket. Additional software may be added to the pen based input device to expand its functions. A "pen" can be used on the screen of the device to direct inputs and outputs. Input may come in the form of selecting an icon displayed on the screen, or by drawing a character which the device is programmed to recognize.

As pen based input devices grow in uses, a demand for such devices continues to grow around the world. Presently, devices are specified for a particular written language by a language script available with the device. The device will support pen based input characters in the specified language and display textual cues in the specified language. For example, there may be a device specified to support Spanish and another device specified to support Mandarin. To support more than one language or additional characters not included in a language script, the user must configure the device to recognize additional characters where each character is recognized by a unique pen stroke. In addition, in specifying each device for a specific language, all software must be compatible with the language script.

It is desirable that a pen based input device support multiple language sets without requiring the user to configure each character and without requiring complex programming changes for each script. In addition, it is desirable that pen strokes be reusable for different languages. With devices that support multiple language scripts, the user would not be forced to purchase multiple devices to support multiple language scripts. In addition, it is desirable that the text support for a hand held device utilize a multilingual standard which provides compatibility with other multilingual devices. For example, the Unicode standard of text support would provide a multilingual standard for compatibility with other devices.

SUMMARY OF THE INVENTION

It is therefore one object of the present invention to provide multilingual data processing systems.

It is another object of the present invention to provide a pen based data processing system.

It is yet another object of the present invention to provide a method and system for supporting multiple language sets in a data processing system where each character of the language set is a pen based character.

The foregoing objects are achieved as is now described. A method and system for supporting multiple language sets in a data processing system where each character of the language set is a pen-based character is provided. A language set is designated among multiple language sets with which a pen-based character is associated within a data processing system in response to a user input. A pen based input character is penned into said data processing system. The pen based input character is identified within only said designated language set. The pen based input character is translated into a graphically displayed iconic representation of the pen based input character represented in a designated language set.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
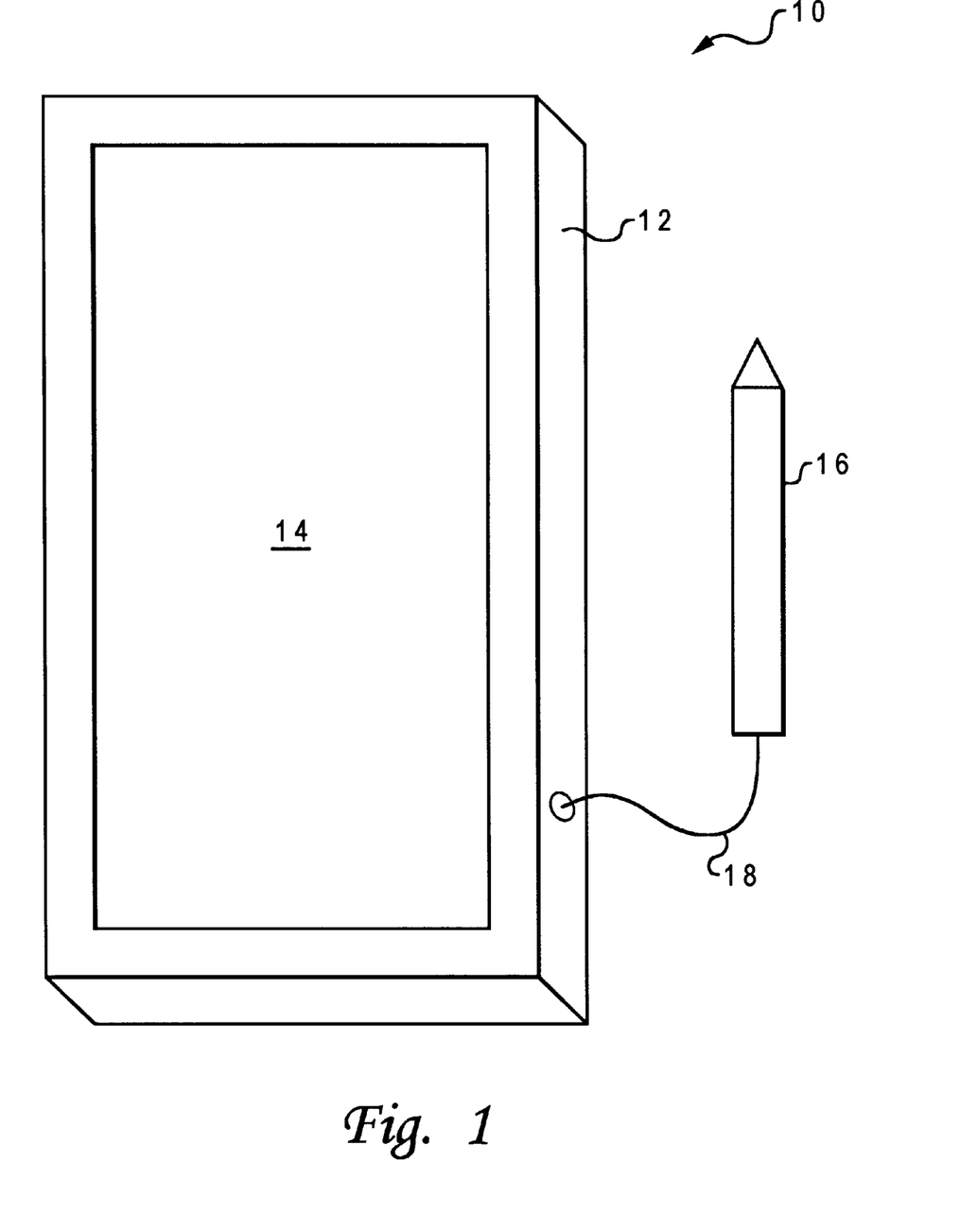
FIG. 1 depicts a high-level block diagram of a representative hardware environment of a hand held data processing system according to the method and system of the present invention.

With reference now to the figures and in particular with reference to FIG. 1, there is illustrated a diagram of a representative hardware environment of a hand held data processing system 10, which utilizes an operating system. Hand held data processing system 10 comprises processor unit 12, touch sensitive display 14 and pen 16 which may or may not be physically attached to hand held data processing system 10 by an attachment cord 18. Touch sensitive display 14 and pen 16 together constitute userinput devices. Touch sensitive display 14 also constitutes as a user output device. Hand held data processing system 10 supports a Graphical User Interface (GUI) which allows a user to provide inputs by selecting an icon or specific location displayed on touch sensitive display 14 via pen 16. In addition, hand held data processing system 10 supports a character recognition interface which allows a user to provide characters by penning a predefined character on touch sensitive display 14 via pen 16. Additional means of input to touch sensitive display 14 may also be provided as is well understood by one skilled in the art.

Figure 2:
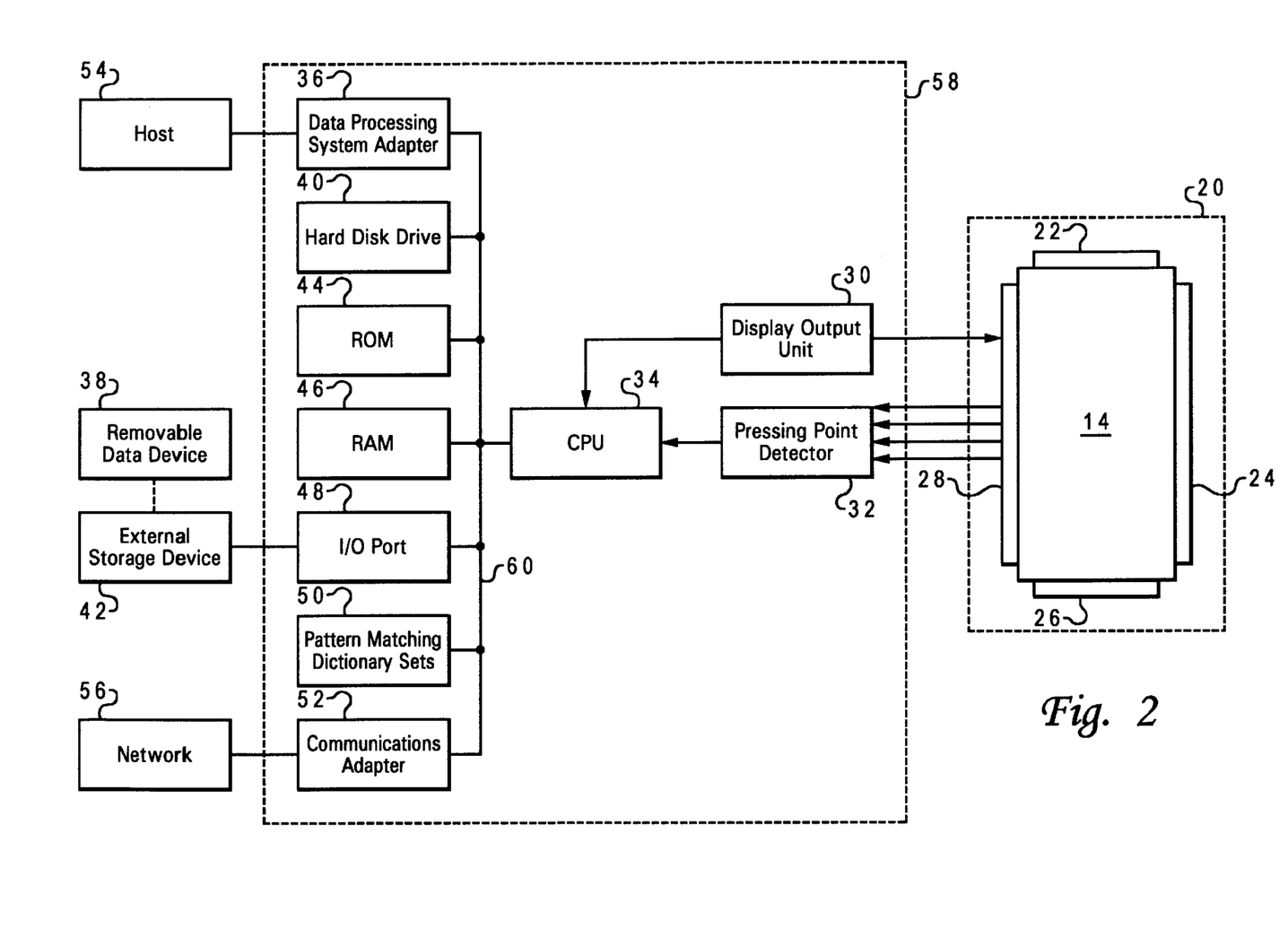
FIG. 2 illustrates a high-level block diagram of a functional diagram of a hand held data processing system according to the method and system of the present invention.

With reference now to FIG. 2, there is depicted a functional block diagram of hand held data processing system 10 illustrated in FIG. 1. Processor unit 58 includes a system bus 60 to which various functional blocks are attached and by which communications among various functional blocks are accomplished. CPU 34, connecting to system bus 60, is supported by read only memory (ROM) 44 and random access memory (RAM) 46, both of which are connected to system bus 60.

ROM 46 contains, among other codes, the Basic Input/Output System (BIOS) which controls certain basic hardware operations, such as interactions of hard disk drive 40 and external data devices. RAM 46 is the main memory within which the operating system having the present invention incorporated and other application programs are loaded. Software which directs the implementation of the present invention may be provided to hand held data processing system 10 for storage in hand held data processing system 10 via a variety of signal-bearing media which include, but are not limited to writeable storage media such as removable data device 38 from which data may be read by an external storage drive 42 into any storage medium of hand held data processing system 10 including ROM 44, hard disk drive 40 and RAM 46.

Referring still to FIG. 2, an I/O adapter 48 is illustrated connected to system bus 60 for providing an interface for peripheral devices including but not limited to external storage drive 42, keyboards, monitors and printers. External storage drive 42 may represent, for example, a floppy disk drive, a magnetic tape drive, or an optical disk drive. Removable data device 38 may represent a floppy disk, magnetic tape, or optical disk which is read by and written to by external storage drive 42. As will be appreciated, removable data device 38 includes a computer usable storage medium having stored therein computer software and/or data. Additional I/O adapters may be included to expand the number of peripheral devices which may be utilized by hand held data processing system 10.

A communications adapter 52 may be utilized to communicate with other data processing systems (not shown) across a network connection 56 which may be supported by network hardware such as a modem or ethernet connection. A modem, for example, allows hand held data processing system 10 to transfer data and software with other data processing systems over the internet through public switched telephone network (PSTN) or ISDN. Software and data transferred via communications adapter 52 are in the form of signals that can be electronic, electromagnetic, optical or other signals capable of being being received by communications adapter 52 via network connection 56.

A data processing system adapter 36 is supported by processor unit 58 to provide a direct connection with a host data processing system 54. Data and software may be transferred to and from host 54 through data processing system adapter 36. Such an adapter is particularly useful when host 54 is a data processing system containing data such as contact information and a calendar where it is desirable that this information, or any other, be duplicated to hand held data processing system 10. Adapter 36 may also support the transfer of software for storage in processor unit 12 for performing the features of the present invention when executed.

Multiple pattern matching dictionary sets 50 are provided to CPU 34 via system bus 60. Well known in the art is a dictionary set for right-handed input and an additional dictionary set for left-handed input where a dictionary is selected based on positions where the hand applies pressure when writing on the screen. However, the multiple pattern matching dictionary sets of the present invention include multiple scripts for multiple Unicode language scripts where the user may select the language script to be utilized. Depending on the language script selected, for each character input to the touch sensitive display 14 via pen 16, the character pattern is recognized by CPU 34 in accordance with a pattern matching method as is well known in the art. Multiple pattern matching dictionary sets 50 may be incorporated within a non-volatile memory as illustrated or may be incorporated in other non-volatile memory available in hand held data processing system 10. Additional language scripts may be added to pattern matching dictionary sets 50 through any of the data transfer means previously described.

CPU 34 supports a display output unit 30 comprising a LCD for displaying images and character data. Display output unit 30 provides the graphical user interface for the LCD touch sensitive display 14. In addition CPU 34 supports a pressing point detector 32. Pressing point detector 32 is utilized to detect a pressed point on touch sensitive display 14 in order to determine the image entered by the user. Many methods of detecting a pressed point have been developed as is understood by one well known in the art. One of these methods includes applying a voltage across the touch sensitive display which is a resistive material such that the difference in potential between resistive areas 22, 23, 24 and 25 may be measured by pressing point detector 32 to determine the area pressed. In another method not shown, a digital position output may be accomplished. For each area pressed, pressing point detector 32 sends a signal through CPU 34 to display output unit 30 with the location of the pressed point whereby display output unit 30 determines which points on the LCD to darken. In addition, for each area pressed, the signal sent through CPU 34 is also utilized to match the pen based character with the data in pattern matching sets 50 to determine the character entered.

Figure 3:
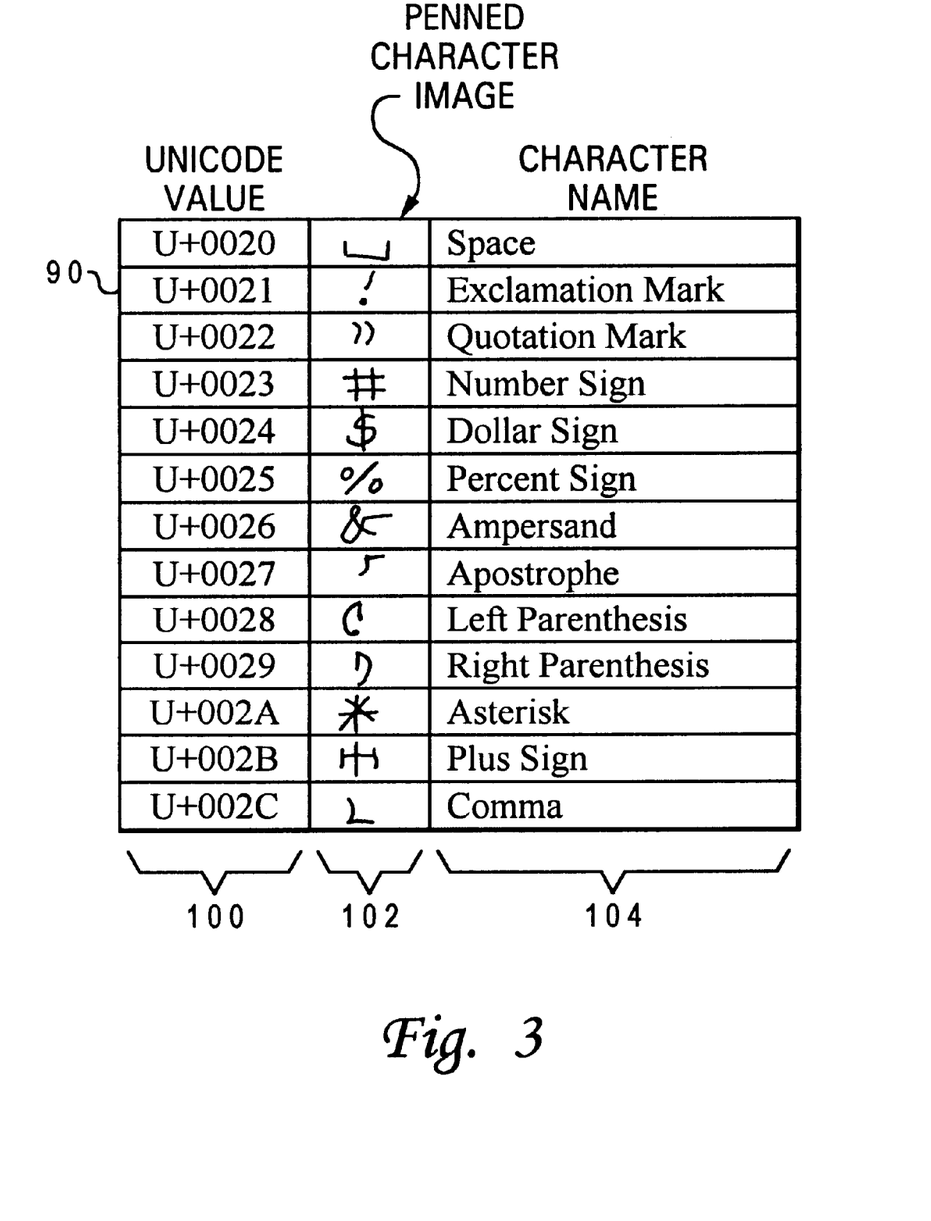
FIG. 3 depicts a pictorial illustration of a Unicode name chart according to the method and system of the present invention.

With reference now to FIG. 3, there is illustrated a pictorial illustration of a portion of a Unicode name chart according to the method and system of the present invention. Unicode is a universal character-encoding standard used representing text for computer processing. The design of Unicode is based on the simplicity and consistency of ASCII, but exceeds ASCII's limited ability to encode only the Latin alphabet. The Unicode standard provides the capacity to encode all the characters used for written languages of the world. Unicode utilizes a 16-bit encoding that provides code points for more than 65,000 characters where each character is assigned a unique 16-bit value. Scripts currently included in the Unicode standard include Latin, Greek, Cyrillic, Armenian, Hebrew, Arabic, Devanagari, Bengali, Gurmukhi, Gujarati, Oriya, Tamil, Teluga, Kannada, Malayalam, Thai, Leo, Georgian, Tibetan, Japanese Kana, Korean Hangul, the unified set of Chinese/Japanese/Korean (CJK) ideographs, and symbol collections including punctuation marks, diacritics, mathematical symbols, technical symbols, arrows and dingbats.

The Unicode standard does not define glyph images, but associates a Unicode value with a character name. In addition, in the application of a pen based input character, the Unicode standard does not define pen based input characters. Therefore, to utilize the Unicode standard with pen based input characters, each pen based input character is identified with a Unicode value. Therefore, the use of the Unicode standard provides a standardized model for text conversion for pen based input characters. In addition, in utilizing Unicode values in storing text, these values may be easily transferred across the communications adapter or to and from the host. As Unicode grows in use in the marketplace for providing multilingual software solutions, the ability for hand held devices to transfer text in Unicode would enhance the available functions of the device.

Referring still to FIG. 3, the name chart depicts the Unicode values for a portion of character names in the Latin character script, which is typically utilized by ASCII. The Unicode values as illustrated at reference numeral 100 are assigned with character names as depicted at reference numeral 104 where each character name is associated with a pen based character image as illustrated at reference numeral 102. For example, in the chart, Unicode value U+0021 is an exclamation mark as illustrated at reference numeral 90. When a pen based exclamation mark is received by the hand held device and the Latin character script is selected, the image is determined to be an exclamation mark whereby the Unicode value U+0021 is identified. The name chart is an example of the Unicode values included in multiple pattern matching dictionary sets 50 of the present invention for identifying a Unicode value after the character of the pen based image has been determined. The penned character images illustrated at reference numeral 102 are examples of the images which may represent the character names depicted. To aid the user in correctly entering the pen based character, a reference card for each language script may be included showing the glyph which will result from a particular pen based input. The same pen based character may be utilized in multiple language scripts such as an exclamation point which is the same character in English and in Spanish.

Figure 4:
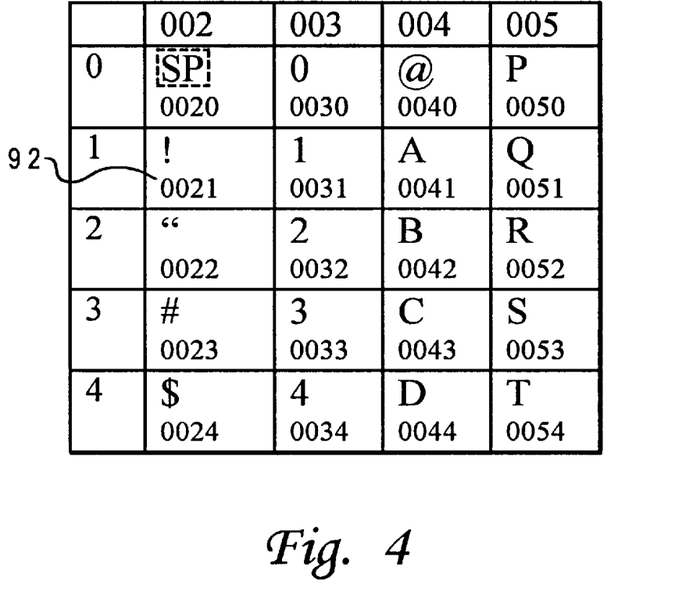
FIG. 4 illustrates a pictorial illustration of a Unicode code chart according to the method and system of the present invention.

With reference now to FIG. 4, there is illustrated a code chart according to the method and system of the present invention. The code chart depicted contains the Unicode values for a portion of the characters in the Latin character script including an example of a glyphic representation associated with each Unicode value for output to the screen. For example, in the code chart, Unicode value U+0021 which was previously referenced in FIG. 3 at reference numeral 90, is represented in the code chart at reference numeral 92 where a glyphic "!" is associated with the Unicode value U+0021. The code chart is an example of the Unicode values included in display output unit 34 of the present invention where the glyphic representations may be altered by the user for ideal screen presentation. For example, multiple fonts may be available to the user where each font includes a set of glyphic representations for each Unicode values.

Figure 5:
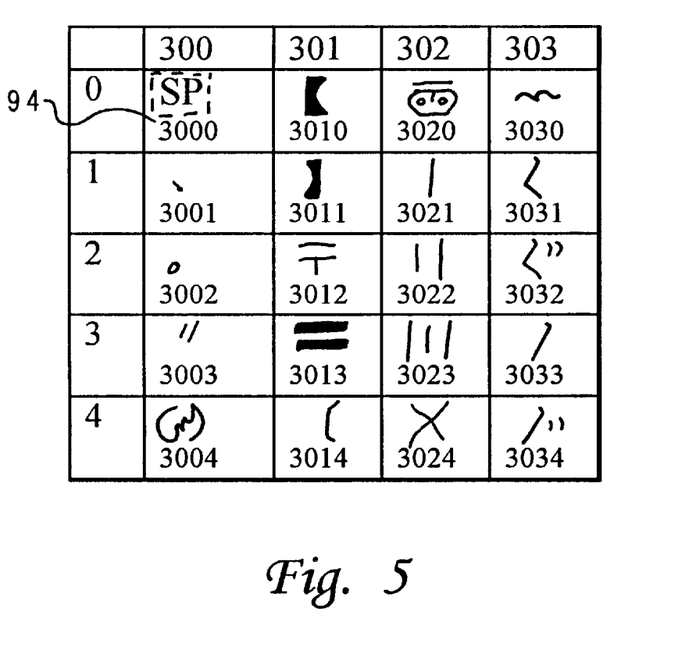
FIG. 5 depicts a pictorial illustration of a Unicode code chart for CJK according to the method and system of the present invention; and, FIG. 6 illustrates a high-level logic flowchart of the method of processing pen-based characters according to the method and system of the present invention.

Referring now to FIG. 5, there is depicted a code chart according to the method and system of the present invention. The code chart illustrated contains the Unicode values for portion of the characters in the CJK symbols and punctuation script including a glyphic representation associated with each Unicode value for output to the screen. For example, the glyphic representation depicted at reference numeral 94 contains a control key which is referenced by Unicode value U+3000. The code chart is an example of the Unicode values included in display output unit 34 of the present invention where the glyphic representations may be altered for ideal screen presentation.

Figure 6:
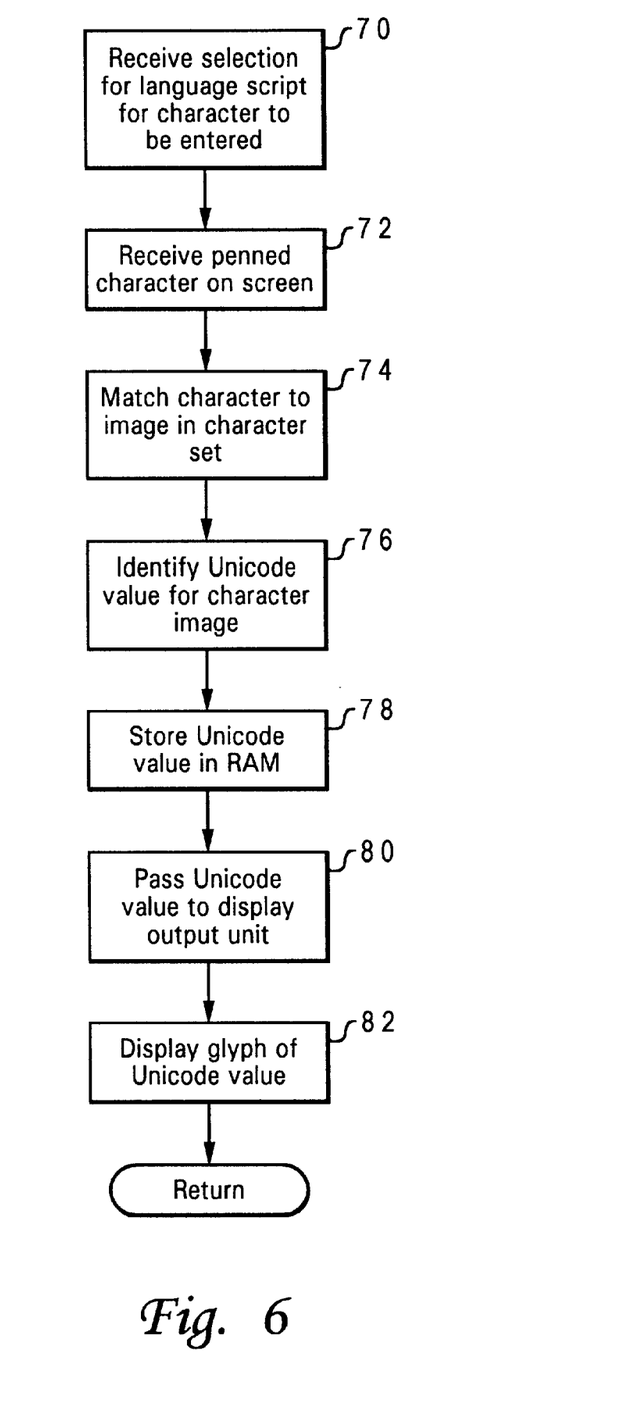

With reference now to FIG. 6, there is depicted a highlevel logic flowchart which illustrates the method of the present invention. It should be appreciated by those skilled in the art that FIG. 6 represents a self-consistent sequence of steps leading to a desired result. The steps are those requiring physical manipulation of physical quantities. Usually, although not necessarily, these quantities take the form of electrical or magnetic signals capable of being stored, transferred, combined, compared and otherwise manipulated. It has proven convenient at times by those skilled in the art to refer to these signals as bits, values, elements, symbols, characters, terms, numbers or the like. It should be born in mind, however, that all of these and similar terms are to be associated with the appropriate physical quantities and are merely convenient labels applied to those quantities.

Further, the manipulations performed are often referred to as terms, such as adding or comparing, which are commonly associated with mental operations performed by a human operator. No such capability of a human operator is necessary or desirable in most cases in any of the operations described herein, which form part of the present invention; the operations are machine operations. Useful machines for performing operations of a preferred embodiment of the present invention include data processing systems such as general-purpose digital computers or other similar devices. In all cases the distinction between the method operations and operating a computer and the method of computation itself should be born in mind. The present invention relates to method steps for operating a processor such as CPU 34 of FIG. 2, in processing electrical or other physical signals to generate desired physical signals to perform the steps of a multilingual translation program.

As illustrated, the process described in FIG. 6 begins at block 70 and thereafter passes to block 72. A plurality of triggers in the operation of CPU 34 may trigger the process, which begins at block 70. The process may also be triggered to begin at block 72 as will be further described.

Block 70 illustrates the receiving of a selection for the language script for the character to be entered by the user. The user may choose a particular language script for each character entered or enter multiple characters in a single language script. After block 70, the process passes to block 72. If the user is entering multiple characters under a single language script, then the process will be triggered to start at block 72 for each character entered whereby the language script currently selected will be utilized. Block 72 depicts the receiving of a penned character on screen as such that the user may view the character as the user is penning the character as will be understood by one well known in the art. Thereafter, the process passes from block 72 to block 74. Block 74 illustrates the matching of the penned character to a penned character image in the name chart for the selected language script. After block 74, the process passes to block 76. Block 76 depicts the identifying of a Unicode value for the penned character image in the name chart. Each character image is coupled with a Unicode value as previously described. Thereafter, the process passes from block 76 to block 78. Block 78 illustrates the storing of the Unicode value in RAM. For each character penned, the Unicode value is stored in order that if the user determines to save the text on screen then the Unicode values for the text on screen are transferred from RAM to ROM. After block 78, the process passes to block 80. Block 80 depicts the passing of the Unicode value to the display output unit. The display output unit will match the Unicode value to a glyph for the screen font selected. Thereafter, the process passes from block 80 to block 82. Block 82 illustrates the displaying of a glyph for the Unicode value. The display output unit controls the appearance of the on-screen character including the font, size and position of the character as selected by the user.

While the invention has been particularly shown and described with reference to a preferred embodiment, it will be understood by those skilled in the art that various changes in form and detail may be made therein without departing from the spirit and scope of the invention. For example, while Unicode is an accepted standard for multilingual textual applications, other scripting standards may be utilized without departing from the spirit and scope of the invention.

In addition, for example, although aspects of the present invention have been described with respect to a data storage system executing software that directs the method of the present invention, it should be understood that the present invention may alternatively be implemented as a computer program product for use with a data processing system. Programs defining the functions of the present invention can be delivered to a data processing system via a variety of signal-bearing media, which include, without limitation, non-writable storage media (e.g. CD-ROM), writable storage media (e.g. a floppy diskette or hard disk drive), and communication media, such as computer and telephone networks including ethernet. It should be understood, therefore, that such signal-bearing media, when carrying or encoding computer readable instructions that direct the method functions of the present invention, represent alternative embodiments of the present invention.

What is claimed is:

1. A method for supporting a plurality of language sets in a data processing system where each character of said language set is a pen based character, said method comprising the steps of:

designating a language set from among a plurality of language sets with which a pen based character is associated within a data processing system in response to a user input;

penning a pen based character for input to said data processing system;

identifying a value from among a plurality of multilingual text standard values for said pen based character within only said designated language set; and translating said value from among said plurality of multilingual text standard values into a graphically displayed iconic representation of said pen based character represented in said designated language set.

2. The method of supporting a plurality of language sets in a data processing system where each character of said language set is a pen based character according to claim 1 where the step of designating a language set among a plurality of language set with which a pen based character is associated within a data processing system in response to a user input further comprises the step of:

selecting a language script from a plurality of Unicode based language sets in response to a user input.

3. The method of supporting a plurality of language sets in a data processing system where each character of said language set is a pen based character according to claim 1 where the step of identifying a value from among a plurality of multilingual text standard values for said pen based character within only said designated language set further comprises the step of:

comparing said pen based character with character images of said designated language set.

4. The method of supporting a plurality of language sets in a data processing system where each character of said language set is a pen based character according to claim 1 where the step of translating said value from among said plurality of multilingual text standard values into a graphically displayed iconic representation of said pen based character represented in said designated language set further comprises the steps of:

storing said value from among said plurality of multilingual text standard values in memory associated with said data processing system; and displaying a glyph associated with said value from among said plurality of multilingual text standard values.

5. A system for supporting a plurality of language sets in a data processing system where each character of said language set is a pen based character, said system comprising:

means for receiving a designation of a language set from among a plurality of language sets with which a pen based character is associated within a data processing system in response to a user input;

means for receiving a pen based character input to said data processing system;

means for identifying a value from among a plurality of multilingual text standard values for said pen based character within only said designated language set; and means for translating said value from among said plurality of multilingual text standard values into a graphically displayed iconic representation of said pen based character represented in said designated language set.

6. The system for supporting a plurality of language sets in a data processing system where each character of said language set is a pen based character according to claim 1 where the means for receiving a designation of a language set from among a plurality of language set with which a pen based character is associated within a data processing system in response to a user input further comprises:

means for selecting a language script from a plurality of Unicode based language sets in response to a user input.

7. The system for supporting a plurality of language sets in a data processing system where each character of said language set is a pen based character according to claim 1 where the means for identifying a value from amona a plurality of multilingual text standard values for said pen based character within only said designated language set further comprises:

means for comparing said pen based character with character images of said designated language set.

8. The system for supporting a plurality of language sets in a data processing system where each character of said language set is a pen based character according to claim 1 where the means for translating said value from among said plurality of multilingual text standard values into a graphically displayed iconic representation of said pen based character represented in said designated language set further comprises:

means for storing said value from among said plurality of multilingual text standard values in memory associated with said data processing system; and means for displaying a glyph associated with said value from among said plurality of multilingual text standard values.

9. A program product for supporting a plurality of language sets in a data processing system where each character of said language set is a pen based character, said program product comprising:

a data processing system usable medium; and a multilingual translation program encoded within said data processing system usable medium that, in response to user input designating a language set from among a plurality of language sets with which a pen based character is associated within a data processing system and in response to user input pen based character to said data processing system:

identifies a value from among a plurality of multilingual text standard values for said pen based character within only said designated language set, and translates said value from among said plurlaity of multilingual text standard values into a graphically displayed iconic representation of said pen based character represented in said designated language set.

10. The program product of claim 9, wherein said multilingual translation program selects a language script from a plurality of Unicode based language sets.

11. The program product of claim 9, wherein said multilingual translation program compares said pen based character with character images of said designated language set.

12. The program product of claim 9, wherein said multilingual translation program:

stores said value from among said plurality of multilingual text standard values in memory associated with said data processing system; and displays a glyph associated with said value from among said plurality of multilingual text standard values.

\* \* \* \* \*

UNITED STATES PATENT AND TRADEMARK OFFICE
CERTIFICATE OF CORRECTION

PATENT NO. : 6,289,303 B1
DATED : September 11, 2001
INVENTOR(S) : Steven Atkin et al.

Page 1 of 1.

It is certified that error appears in the above-identified patent and that said Letters Patent is hereby corrected as shown below:

<u>Column 8,</u>
Line 32, please change "amona" to -- among --.

Signed and Sealed this

Seventh Day of May 2002

*Attest:*

JAMES E. ROGAN
*Attesting Officer*   *Director of the United States Patent and Trademark Office*